(12) United States Patent
Cerroni

(10) Patent No.: US 8,187,719 B2
(45) Date of Patent: May 29, 2012

(54) METHOD FOR OBTAINING A BIO-STABILISED WOODLAND SUBSTRATE FROM THE INTEGRAL CYCLE OF URBAN SOLID WASTE TREATMENT

(75) Inventor: Manlio Cerroni, Rome (IT)

(73) Assignee: Sorain Cecchini Ambiente SCA S.p.A., Rome (IT)

( * ) Notice: Subject to any disclaimer, the term of this patent is extended or adjusted under 35 U.S.C. 154(b) by 965 days.

(21) Appl. No.: 12/158,782

(22) PCT Filed: Dec. 8, 2006

(86) PCT No.: PCT/EP2006/069467
§ 371 (c)(1),
(2), (4) Date: Aug. 7, 2008

(87) PCT Pub. No.: WO2007/071571
PCT Pub. Date: Jun. 28, 2007

(65) Prior Publication Data
US 2008/0310921 A1    Dec. 18, 2008

(30) Foreign Application Priority Data
Dec. 21, 2005   (IT) .............................. MI2005A2430

(51) Int. Cl.
*B32B 5/16* (2006.01)

(52) U.S. Cl. ........ 428/532; 428/533; 428/534; 428/535; 428/536; 428/537.1; 428/537.5

(58) Field of Classification Search .................. 428/532, 428/533, 534, 535, 536, 537.1, 537.5
See application file for complete search history.

(56) References Cited

U.S. PATENT DOCUMENTS

| 7,772,453 B2 * | 8/2010 | Cerroni ......................... 588/405 |
| 2003/0003568 A1 | 1/2003 | Yilmaz |
| 2003/0121851 A1 | 7/2003 | Lee, Jr. |
| 2008/0006034 A1 * | 1/2008 | Cerroni ........................... 60/780 |

FOREIGN PATENT DOCUMENTS

| EP | 1736461 | * 12/2006 |
| WO | WO2007/071571 | * 6/2007 |

OTHER PUBLICATIONS

International Search Report dated Apr. 18, 2007.

* cited by examiner

*Primary Examiner* — Leszek Kiliman
(74) *Attorney, Agent, or Firm* — Knobbe, Martens, Olson & Bear, LLP

(57) ABSTRACT

A method for obtaining a woodland substrate from the complete recycling of the materials recovered from treatment of urban solid waste is disclosed. The woodland substrate obtained by the process is also described.

23 Claims, 2 Drawing Sheets

Figure 1:
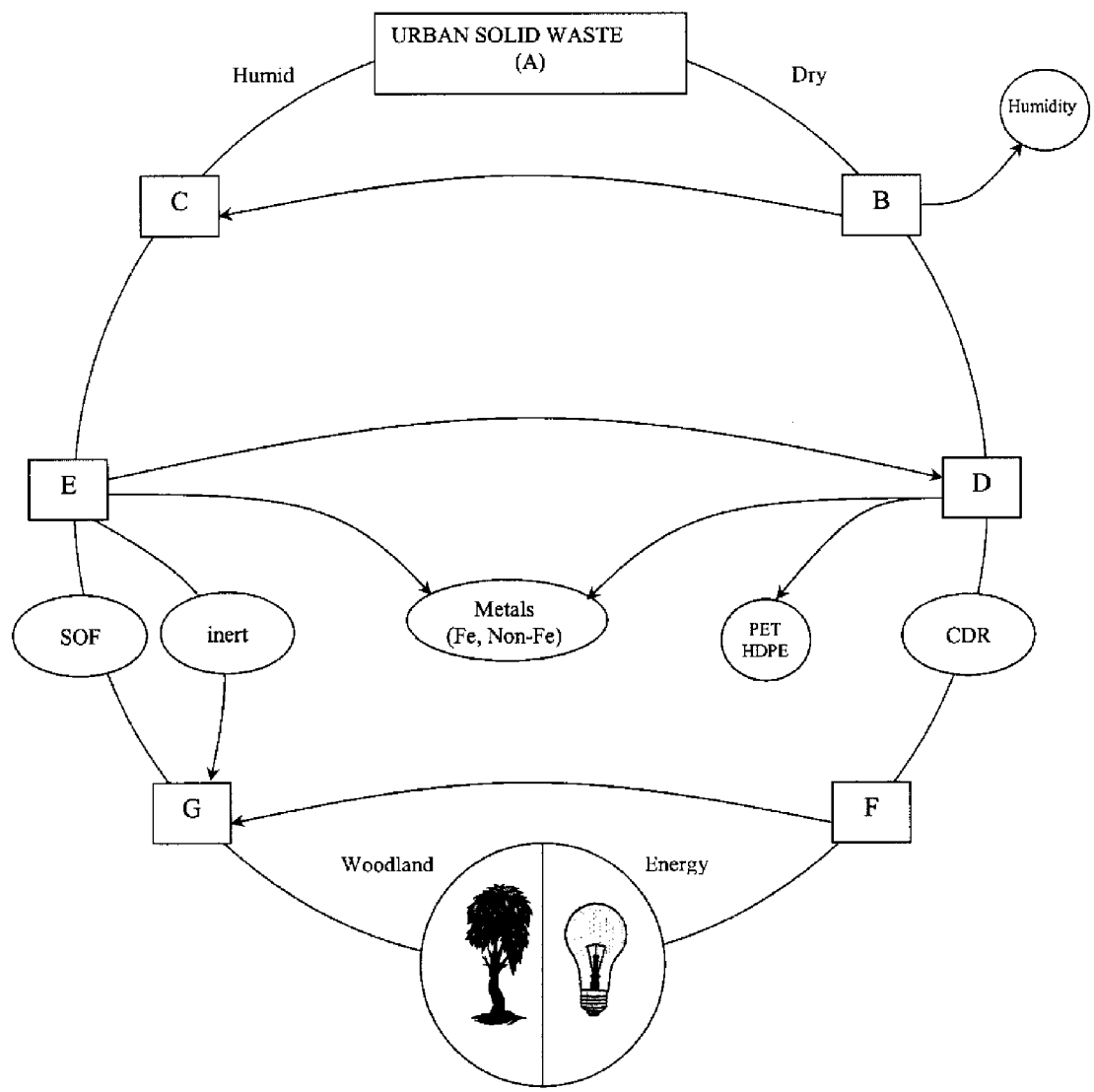

METHOD FOR OBTAINING A BIO-STABILISED WOODLAND SUBSTRATE FROM THE INTEGRAL CYCLE OF URBAN SOLID WASTE TREATMENT

CROSS-REFERENCE TO RELATED APPLICATIONS

This application is the U.S. National Phase under 35 U.S.C. §371 of International Application PCT/EP2006/069467, filed Dec. 8, 2006, which claims priority to IT MI2005A002430, filed Dec. 21, 2005.

FIELD OF THE INVENTION

The present invention concerns a method of automatic and integral treatment of undifferentiated Urban Solid Waste and of similar waste so to obtain:
a) multilayer woodland substrate composed of suitably arranged Stabilised Organic Fraction, neutralised inert residue and vitreous mineral residue
b) Ferrous and non-ferrous metals;
c) Energy from Refuse-Derived Fuel (RDF)

STATE OF THE ART

Any substance derived from human activities or from natural cycles that is abandoned or destined to be abandoned is defined as "waste".

Urban Solid Waste (USW) represents the fraction of waste in solid form produced in the home, either as such or resulting from separate waste collection. It is composed of a fairly variable range of materials and has consequently different chemical and physical characteristics (humidity, specific weight, calorific value, ash, etc.) depending on the geographic area, the economic and social situation, the season, etc.

There is no doubt that developing countries produce a high concentration of organic material (kitchen waste), which in some cases is 70% in weight of the total waste, while industrialised countries discard a quantity of paper, cardboard, plastic, poly-coupled and aluminium packaging, etc., which represent 60% of the weight.

The quantity of USW produced per head is also quite different, with values varying from 300-400 grams/inhabitant per day in developing countries to 2,000 grams/inhabitant per day in strongly developed countries. The existence or absence of separate collection for some classes of waste in a specific geographical area also increases the variability of the composition.

As an example, the typical composition of the waste materials that constitutes USW in the city of Rome is listed below (year 2005):

| USW mean waste material analysis City of Rome (2005) | |
|---|---|
| Fractions | (% in weight) |
| Screened 20 mm | 8% |
| Organic kitchen waste | 25% |
| Paper and cartons | 28% |
| Plastic film | 9% |
| Hard plastics | 4% |
| Textiles | 6% |
| Leather/rubber | 2% |
| Diapers/Nappies | 2% |
| Wood/greenery | 3% |

| USW mean waste material analysis City of Rome (2005) -continued | |
|---|---|
| Fractions | (% in weight) |
| Ferrous and non-ferrous | 3.5% |
| Glass/Ceramics/Stones | 7% |
| Bulky | 0.5% |
| Remaining | 2% |

Considering the heterogeneous and variable composition of urban solid waste, it is of particular importance to find a correct method of treatment, both for the recovery of materials and in terms of safety and compliance with the regulations on the protection of the environment.

At present there are different methods of treatment which will be listed below:

Controlled Disposal:

It consists of spreading layers of refuse on the ground which has been previously prepared so as make negligible the undesired effects on the environment (waterproofing, waste water collection, harnessing biogas, etc.). It is an autonomous system and presents considerable advantages such as speed of realisation and inexpensiveness. However the system requires correct programming, construction, management and control. If it is not correctly used, the system may have a negative effect on the soil, the subsoil and the atmosphere. In the production stage it is also necessary to consider the refuse (quality and quantity), the geology of the landfill site, the climate and the hydrology. The highest environmental risks are determined by waste water and biogas: waste water contains biological and chemical contaminants, biogas, instead, is a mixture of gas produced by (anaerobic) fermentation, the formation process of which is slow and begins with the production of organic acids and then of carbon dioxide and methane. It is important for the methane not to be freely dispersed in the atmosphere, since it contributes to the greenhouse effect; for the safeguarding of the environment and as a productive factor it is therefore fundamental to harness it and recover it for energy purposes.

Another disadvantage of landfill is the necessity, imposed by law in many countries, of monitoring the environmental impact for a long time after the site has been closed ("post-mortem" management), with huge additional costs for at least 30 years after closure. Lastly it must be considered that, with European Directive 1999/31/EC, the European Community has in fact forbidden the dumping of unseparated USW, requiring that member countries treat it so as to deposit only the processing residue at the site. This policy has been partly absorbed by member countries, while absorption of other parts is in progress.

Incineration of USW:

the incineration of un-separated USW initially intended only for the thermal destruction of USW, is today becoming, thanks to the increase of the calorific value (2000 Kcal/Kg.), also an important way of recovering energy in various forms.

Among the advantages offered by the system there is a consolidated and successful technology.

Among the disadvantages, the production of residue amounting to 20-30% in weight of the incoming USW which require an adequate landfill site, the high costs of maintenance and installation, and an exacting control of the emissions, which also comes up against the aversion and lack of consent from citizens in the identification of sites suitable for realisation.

Mechanical-Biological Treatment:

This concerns a series of treatment methods, among which:

a) RECOVERY OF THE COMBUSTIBLE FRACTION: refuse-derived fuel (RDF) is generated from a range of combustible materials, the common denominator of which is their origin, that is urban solid waste (USW). The most common RDF is derived from USW subjected to procedures of grinding and removal of metals, glass and inorganic substances to make it a product in conformity with the national laws and standards (DM May 2, 1998 and UNI 9903/2004)

The advantages of RDF are its homogeneity, constancy and high calorific value, conservability and transportability.

RDF may be used in systems for the production of electric energy, such as waste to energy plants with cooled grate, gasifiers, fluid beds and also in co-combustion in conventional plants with solid fuel. RDF may also be used in cement works and other industrial activities in co-combustion with traditional fuels. The recovery treatments, after the processes listed above, are systems conceived and managed with a view to the separation of the various pure or less pure waste material components. Practically it means assigning the organic fraction to composting, the materials with the highest energy content to combustion, and the rest to landfill.

COMPOSTING PROCESS: this is the biological transformation into compost of the organic fraction present in waste. It is subdivided into:

1) latency phase, necessary for the colonisation of the environment of micro-organisms;
2) phase of rapid growth, which involves the rise in temperature due to the effect of the heat produced by the metabolic reactions;
3) thermophilic phase, in which the temperature arrives at more than 60° C. (the duration is about one week or more), and
4) mesophilic or maturing phase, during which there is a slow fall in temperature and an increase of the humidified fractions of the organic substance (for the duration of one month or more).

The compost obtained at the end of the treatment is a soil structure corrector, it favours the re-equilibrium of the thermal nature of the soil, restoring organic matter, softness and bearing structure (exhausted soils), permeability and workability (clayey soil). It is also an organic amendment for different types of crops, especially tree crops, and for forestry. The technological and management optimisation of the composting system is accomplished by regulating a number of parameters:

a) preparation, mixing, aeration of the mass to be composted;
b) temperature, humidity, pH, limiting factors and noxiousness factors;
c) reclaiming, cleaning and presentation of the finished product.

SCOPE OF THE INVENTION

The multiplicity and complexity of the treatment and recycling processes listed above show, starting from urban solid waste, how the ways followed to recover materials are various and independent of one another. However, each of these implies the production of a final residue and of a more or less accentuated impact on the environment. The present invention therefore sets as its first aim the use of processes for the treatment and recovery of materials in a single integrated production cycle (FULL CIRCLE SYSTEM) having as its end the production of a biologically stabilised woodland substrate and the production of energy and metals, without there being any processing residue to be sent to landfill.

Another aim of the invention is the production of a woodland substrate from all the materials recovered from urban solid waste, which presents optimum properties of geotechnical stability, which is biologically stabilised, neutralised, and which does not present the inconvenience of giving rise to percolation and the production of biogas. This absence of environmental impact completely avoids the management and "post-mortem" costs necessary for landfill sites.

A further aim of the invention is the realisation of a multi-stratified woodland substrate in which an additional waterproofing layer for isolating it from the subsoil is not necessary. A particularly interesting use is, for example, environmental improvement such as the reclamation of exhausted quarries, degraded land, etc.

The problems listed above are solved by a method for obtaining a woodland substrate according to claim 1 and by a woodland substrate according to claim 8. Further advantages of the invention are indicated in the dependent claims.

DESCRIPTION OF THE INVENTION

Figure 2:
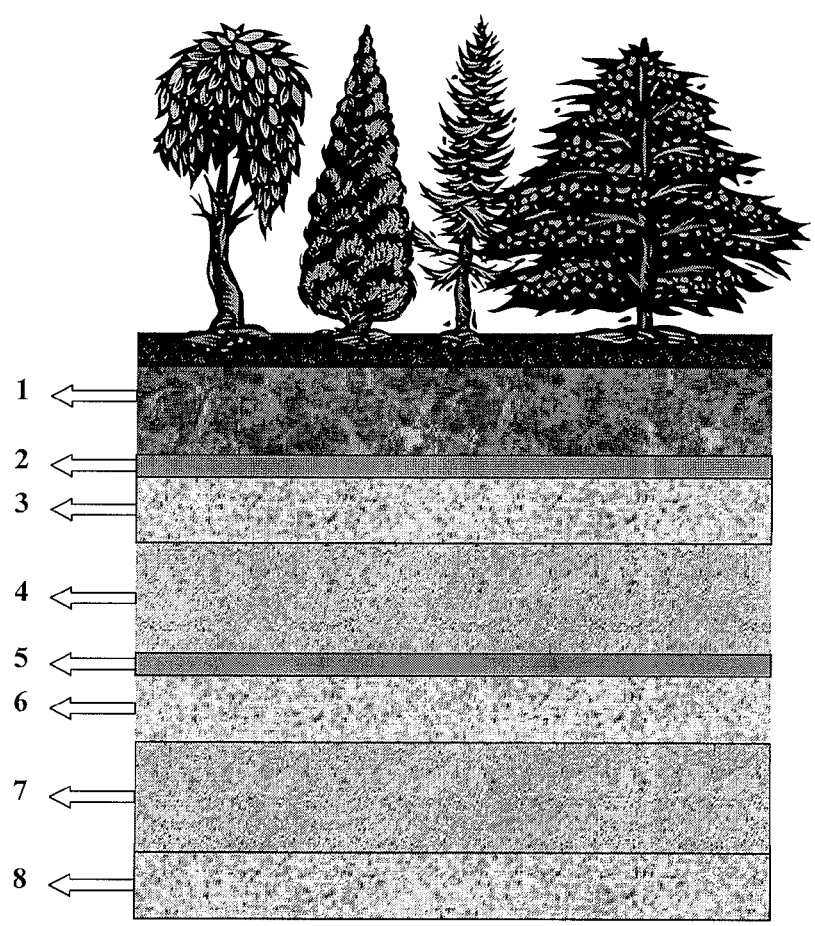

The detailed description of the invention will be given with the aid of figures. They show:

FIG. 1: the cycle for production of the woodland substrate, of energy and metals according to the invention, FIG. 2: an example of stratification of the claimed woodland substrate.

The process forming the object of the present invention comprises the following phases:

separation of waste into a humid fraction and a dry fraction (A), treatment of the dry fraction and obtaining of RDF (B) and solid materials (D), treatment of the products derived from the production of RDF in a gasifier (F) and obtaining of electric energy and/or hydrogen, and production of an inert residue in the form of vitreous mineral granulate, biological stabilisation of the humid fraction (C), refining of the stabilised material (E) with production of: Stabilised Organic Fraction (SOF), hygienised processing residues with controlled sizes, RDF to be sent to gasification.

stratification of the woodland substrate (G) in:

a) at least one layer of stabilised organic fraction (4) with a homogeneous matrix;
b) at least one layer of hygienised inert processing residue (3) with controlled sizes deriving from phase (E);
c) at least one layer of vitreous mineral residue (2) with controlled sizes deriving from the gasification phase (F) and
d) a layer comprising earth and biostabilised compost (1).

It is important to point out that this multilayer sandwich structure, and in particular the sequence of ers (2), (3) and (4), may be repeated n times. The number of repetitions of the layers and also their exact thickness will depend on the specific conditions of the environmental reclaiming operation to be carried out. In order to obtain a subsoil waterproofing effect and to avoid possible slipping due to lack of friction between the substrate and the subsoil itself, it is however necessary for the layer of hygienised inert processing residues to be always the bottom layer.

The primary separation which takes place in phase (A) contemplates that the initial volumes of the dry fraction and the humid fraction will be the same. At this point the dry fraction and the humid fraction follow two distinct and parallel work processes. The dry phase is assigned to the production of RDF (B), where a quantity of 5-15% of the material still constitutes a humid phase which is therefore reassigned to the respective processing cycle, and in particular to the biological stabilisation phase (C). Phase (B) contemplates a series of treatments for reducing the size by grinding, gravimetric separation and drying.

At this point the dry fraction is subjected to the recovery of materials (D) from which ferrous and non-ferrous metals are obtained, and hard plastics (PET, HDPE). The materials recovered in this phase account for about 3-5% of the initial waste, while the RDF produced accounts for about 35%. The fuel obtained is sent on to the gasification phase (F), from which, besides energy production, a layer of inert residue is also obtained in the form of vitreous mineral granulate (3) which will be used in the realisation of the woodland substrate (G). It is clear that the quantity of the materials recovered indicated above are linked with the quality of the treated waste.

After having undergone biological stabilisation (C), the humid fraction proceeds to the refining of the stabilised material (E), from which are separated, as well as SOF, also inert solid materials (glass, stones, etc.), ferrous and non-ferrous metals and a "dry" fraction comparable to RDF (mainly plastic, textiles and poly-coupled material in small sizes). This last fraction, accounting for about 5-10% of the incoming waste, combines with the rest of the RDF to be sent to the gasification phase (F) after recovery of some plastics in phase (D). The inert solid materials, which account for about 10-20% of the incoming waste, will be used for the preparation of the woodland substrate (G) along with the SOF and the mineral granulate from gasification.

The woodland substrate according to the present invention is made up of different layers, each having a particular role.

According to a preferred embodiment of the invention, as shown in FIG. 2, it comprises:

a) a first layer of hygienised inert residue with controlled size 0-30 mm (8) deriving from phase (E); depending on the hydrogeological characteristics of the site, the thickness of this layer may vary from 0.3 to 1 meter
b) a first layer of SOF (7); depending on the hydrogeological characteristics of the site, the thickness of this layer may vary from 3 to 7 meters
c) a second layer of hygienised inert residue with controlled size 0-30 mm (6) deriving from phase (E); depending on the hydrogeological characteristics of the site, the thickness of this layer may vary from 0.3 to 1 meter
d) a first layer of vitreous mineral residue with controlled size 0-2 mm (5) deriving from the gasification phase (F); depending on the hydrogeological characteristics of the site, the thickness of this layer may vary from 0.1 to 0.5 meter
e) a second layer of SOF (4); depending on the hydrogeological characteristics of the site, the thickness of this layer may vary from 3 to 7 meters
f) a third layer of hygienised inert residue with controlled size 0-30 mm (3) deriving from phase (E); depending on the hydrogeological characteristics of the site, the thickness of this layer may vary from 0.3 to 1 meter
g) a second layer of vitreous mineral residue with controlled size 0-2 mm (2) deriving from the gasification phase (F); depending on the hydrogeological characteristics of the site, the thickness of this layer may vary from 0.1 to 0.5 meter
h) a vegetal layer (1) comprising earth and compost; depending on the type of plants the thickness of this layer may vary from 0.4 to 2 meters.

The first upper layer of this substrate (1) is suitable for planting.

Below it, the layer of vitreous mineral residue (2) with controlled size less than about 2 mm and the underlying layer of hygienised inert residue (3) with controlled size less than about 30 mm act as geotechnical stabilisers of the soil and as draining supports for collecting the meteoric waters that infiltrate the soil, avoiding percolation towards the layers below.

The biostabilised organic fraction represents the main layer of the sandwich (4). Thanks to the treatment it has undergone, its homogeneous stable matrix acts as a base for the reclamation work.

Beneath this layer the sequence is repeated: the layer of vitreous mineral residue (5), the underlying layer of hygienised inert residue (6) and the layer of stabilised organic fraction (7).

The final layer composed of hygienised inert residue (8) acts as an interface element between the SOF (7) and the bottom, to avoid possible slipping due to lack of friction. As may be noted, the advantages obtained by this type of multi-layer substrate are many, as it completely eliminates the problem linked with the development of percolates and with their infiltration of the subsoil without the need to use an additional waterproofing layer. Moreover, the present invention eliminates the landfill concept and so avoids the expensive costs linked with its "post-mortem" management.

Lastly it should be remembered that, by eliminating landfill sites, this invention avoids consistent portions of the territory being "lost" in that specific activity and, at the same time, by reclaiming degraded sites, it returns them as green areas for the benefit of the community.

What is claimed is:

1. Method for obtaining a substrate suitable for planting from the complete recycling of the materials recovered from the treatment of urban solid waste, comprising the following phases:
    (A): separating the waste into a humid fraction and a dry fraction,
    (B): treating the dry fraction and obtaining of Refuse Derived Fuel (RDF)
    (D): obtaining solid materials,
    (F): treating the products derived from the production of RDF in a gasifier and obtaining of electric energy and/or hydrogen, and production of an inert residue in the form of vitreous mineral granulate,
    (C): stabilising the humid fraction biologically,
    (E): refining the stabilised material with production of: Stabilised Organic Fraction (SOF), hygienised processing residues with controlled sizes and RDF to be sent to gasification;
    (G): stratifying the substrate suitable for planting comprising:
        (a) at least one layer of stabilised organic fraction with a homogeneous matrix;
        (b) at least one layer of hygienised inert processing residue with controlled sizes deriving from phase (E);
        (c) at least one layer of vitreous mineral residue with controlled sizes deriving from the gasification phase (F) and
        (d) a layer comprising earth and biostabilised compost.

2. Method according to claim 1, wherein the initial volumes of the dry fraction and the humid fraction are the same.

3. Method according to claim 1, wherein the solid materials recovered in phase (D) and in the compost refining phase (E) comprise inert waste, plastic and metals.

4. Method according to claim 1, wherein a quantity of 5-15% of the material used in phase (B) for the production of RDF is composed of the organic fraction recovered and sent to phase the biological stabilisation phase (C).

5. Method according to claim 1, wherein the solid materials recovered from phase (D) account for about 3-5% of the initial waste.

6. Method according to claim 1, wherein the solid materials recovered from the compost refining phase (E) account for about 10-20% of the initial waste.

7. Method according to claim 1, wherein the RDF produced accounts for about 35% of the initial waste.

8. Substrate suitable for planting derived from the complete recycling of the materials recovered from the treatment of urban solid waste according to claim 1, comprising the following layers:
  a) at least one layer of stabilised organic fraction with a homogeneous matrix,
  b) at least one layer of hygienised inert processing residue with controlled sizes,
  c) at least one layer of vitreous mineral residue with controlled sizes, and
  d) a layer comprising earth and biostabilised compost.

9. Substrate suitable for planting according to claim 8, wherein the stabilised organic fraction forms the base of the substrate suitable for planting.

10. Substrate suitable for planting according to claim 8, wherein the layer of hygienised inert processing residue and the layer of vitreous mineral residue are geotechnical stabilisers of the soil and draining supports for collecting the meteoric waters that infiltrate the soil, avoiding percolation towards the layers below.

11. Substrate according to claim 8, wherein the layer comprising earth and bio-stabilised compost is suitable for planting.

12. Substrate according to claim 8, wherein the size of the vitreous mineral residue is smaller than 2 mm.

13. Substrate according to claim 8, wherein the size of the hygienised inert processing residue is smaller than 30 mm.

14. Substrate according to claim 8, where the layer of hygienised inert Processing residues is always the bottom layer.

15. Substrate according to claim 8, comprising:
  a) a first layer of hygienised inert residue with controlled size;
  b) a first layer of SOF;
  c) a second layer of hygienised inert residue with controlled size;
  d) a first layer of vitreous mineral residue with controlled size;
  e) a second layer of SOF;
  f) a third layer of hygienised inert residue with controlled size;
  g) a second layer of vitreous mineral residue with controlled size;
  h) a vegetal layer comprising earth and compost.

16. Substrate according to claim 15, wherein the thickness of the first layer of hygienised inert residue is between 0.3 m and 1 m.

17. Substrate according to claim 15, wherein the thickness of the first layer of SOF is between 3 m and 7 m.

18. Substrate according to claim 15, wherein the thickness of the second layer of hygienised inert residue is between 0.3 m and 1 m.

19. Substrate according to claim 15, wherein the thickness of the first layer of vitreous mineral residue is between 0.1 m and 0.5 m.

20. Substrate according to claim 15, wherein the thickness of the second layer of SOF is between 3 m e 7 m.

21. Substrate according to claim 15, wherein the thickness of the third layer of hygienised inert residue is between 0.3 m and 1 m.

22. Substrate according to claim 15, wherein the thickness of the second layer of vitreous mineral residue is between 0.1 m and 0.5 m.

23. Substrate according to claim 15, wherein the thickness of the vegetal layer is between 0.4 m and 2 m.

* * * * *